(12) United States Patent
Boyles et al.

(10) Patent No.: US 7,687,584 B2
(45) Date of Patent: Mar. 30, 2010

(54) MISCIBLE TRANSPARENT BLENDS OF AROMATIC POLYCARBONATES WITH POLYCARBONATE POLYMERS CONTAINING HIGH-ASPECT RATIO MONOMERS

(75) Inventors: David A. Boyles, Rapid City, SD (US); John T. Bendler, Annapolis, MD (US); Tsvetanka Filipova, Rapid City, SD (US)

(73) Assignee: South Dakota School of Mines and Technology, Rapid City, SD (US)

( * ) Notice: Subject to any disclaimer, the term of this patent is extended or adjusted under 35 U.S.C. 154(b) by 771 days.

(21) Appl. No.: 11/491,797

(22) Filed: Jul. 24, 2006

(65) Prior Publication Data

US 2008/0021177 A1 Jan. 24, 2008

(51) Int. Cl.
*C08L 69/00* (2006.01)
(52) U.S. Cl. .................. 525/469; 525/462; 528/196; 528/204
(58) Field of Classification Search .................. None
See application file for complete search history.

(56) References Cited

U.S. PATENT DOCUMENTS

| | | | |
|---|---|---|---|
| 4,879,354 A | 11/1989 | Harris et al. | |
| 5,187,243 A | 2/1993 | Jordan et al. | |
| 6,462,146 B2 | 10/2002 | Mahood | |
| 6,492,486 B1 * | 12/2002 | Mahood | 528/196 |
| 2004/0254327 A1 | 12/2004 | Boyles | |

OTHER PUBLICATIONS

Filipova, Novel Aromatic Polycarbonate Blends, Polymer Preprints 46(2) pp. 955-956 + email attachment; Aug. 2005.*
Kim and Paul, "Effects of Polycarbonate Molecular Structure on the Miscibility with Other Polymers," Macromolecules, 1992, vol. 25, pp. 3097-3105.
Haggard and Paul, "Blends of High Temperature Copolycarbonates with Bisphenol-A-polycarbonate and a Copolyester," Polymer, 2004, vol. 45, pp. 2313-2320.
Boyles, et al., "Synthesis of High Aspect Ratio Bisphenols and Polycarbonates Incorporating Bisaryl Units," Macromolecules, 2005, vol. 38, pp. 3622-3629.
Filipova, et al., "Polycarbonate of a Bisphenol A Analogue having Three Aryl Rings," 230th ACS National Meeting, Washington, DC, Aug. 2005.

* cited by examiner

*Primary Examiner*—David Buttner
(74) *Attorney, Agent, or Firm*—Gordon & Rees LLP

(57) ABSTRACT

The present invention relates to a miscible transparent polymer blend, specifically, a polycarbonate blend which comprises homopolycarbonates and/or copolycarbonates. In particular, high aspect ratio monomers confer unique miscibility properties on polycarbonates. Miscible, transparent blends have been found to form from polycarbonate mixtures containing as components of the mixture (1) polycarbonates of bisphenol A monomers copolymerized with a variety of bisphenols, and (2) polycarbonates containing high aspect ratio monomers.

24 Claims, 3 Drawing Sheets

FIG. 1 Solution Blending, Example I
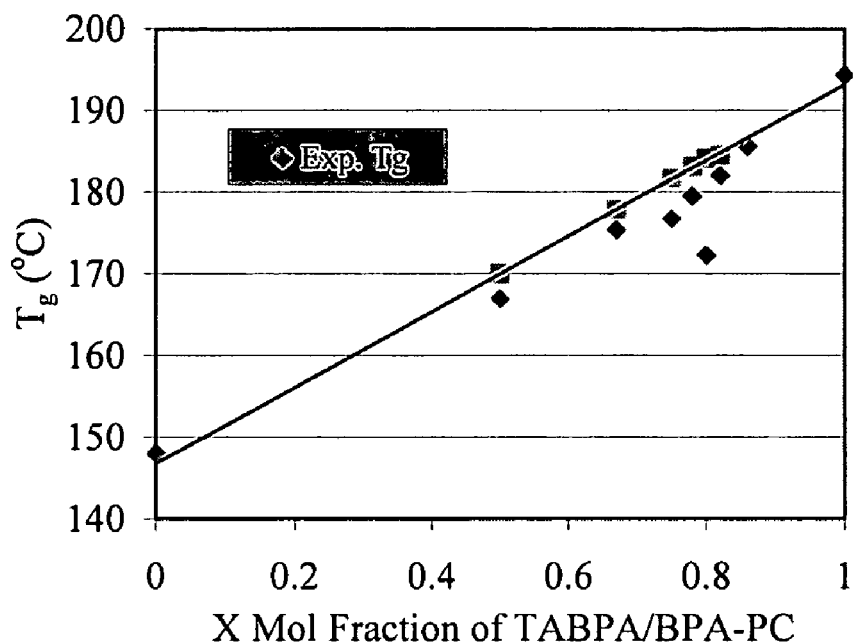
FIG. 2 Melt Blending, Example I
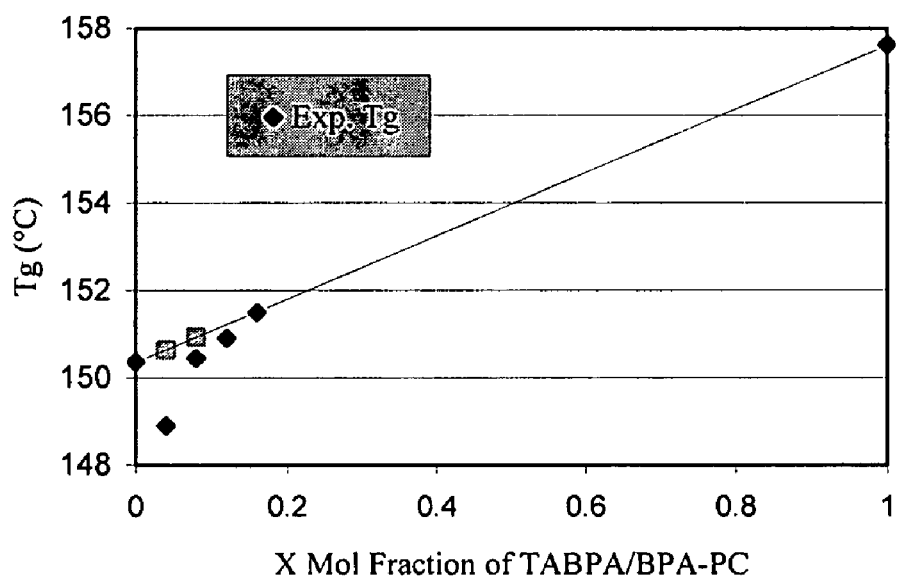

FIG. 3 Solution Cast, Example II
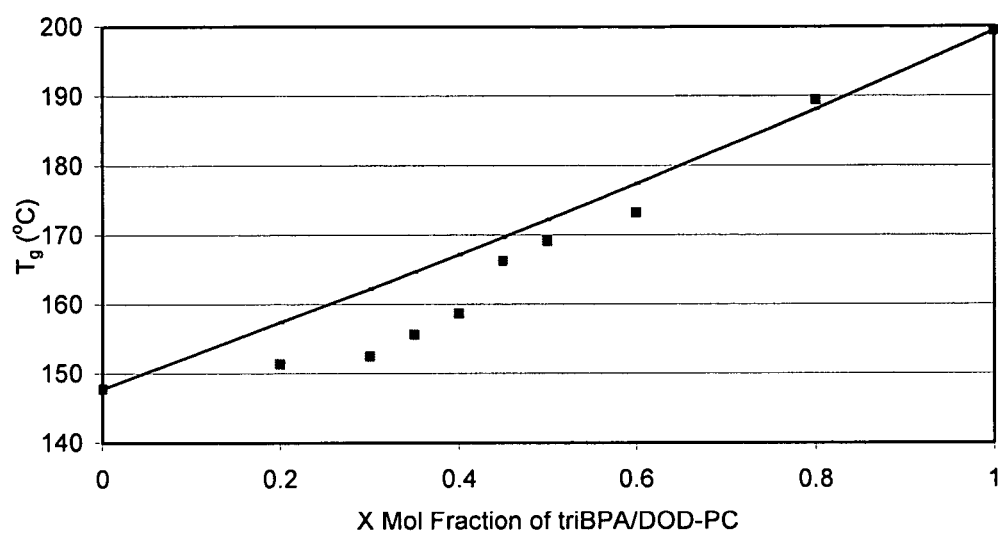

MISCIBLE TRANSPARENT BLENDS OF AROMATIC POLYCARBONATES WITH POLYCARBONATE POLYMERS CONTAINING HIGH-ASPECT RATIO MONOMERS

This invention was produced in part using funds from the Federal- Army Research Office W911NF-05-1-0424 CFDA #12.431. Consequently the U.S. Government has certain rights in this invention.

TECHNICAL FIELD

The present invention relates to a miscible transparent polymer blend, particularly, a polycarbonate blend which comprises two or more aromatic polycarbonate polymers.

BACKGROUND OF THE INVENTION

Polymer blends are both of fundamental scientific interest as well as commercial importance. The vast majority of polymers do not form blends, but phase-separate. The discovery of polymers that blend is considered a fortuitous event; particularly should they blend in all proportions. Since the cost, properties and processability of polymer blends are major considerations toward their commercialization, the discovery of blendable polymers is of considerable interest both to the polymer community as well as commercially. The addition of a polymer which is very expensive to an inexpensive polymer may not only enhance the properties and performance of the less expensive polymer, but has the potential to also lower the cost of the more expensive polymer if it can be blended with less expensive materials.

The majority of polymer pairs are immiscible and dispersion of one phase into the other leads to phase separation or otherwise tends to produce materials lacking useful properties. A limited number of polymer pairs are partially or fully miscible and the resulting blends may be homogeneous with useful properties, suggesting that polymer-polymer interactions on a molecular level have occurred and are directly related to the chemical structure of the repeat unit (Charrier, Polymeric Materials and Processing-Plastics, Composites and Elastomers, Munich: Hanser 1990). Harris, et al. have previously given many citations which confirm the fortuitous nature of finding polymers which are miscible and form blends (U.S. Pat. No. 4,879,354). BPA-PC blends with polymers other than polycarbonates are known which exhibit high mechanical strength, excellent ductility and thermal resistance, along with ease of processing. In these cases the polycarbonate was blended with styrenics, such as acylonitrile-butadiene-styrene ("ABS") or acrylonitrile-styrene-acrylate ("ASA"), or with polyesters, such as polyethylene terephthalate ("PET") or polybutylene terephthalate ("PBT"), but not with other polycarbonates.

That polycarbonate blends with aromatic polycarbonates are unusual as appreciated from the polymer literature. An early paper by Kim and Paul lists 9 homopolycarbonates which are NOT miscible with BPA-PC, and indicates specifically that "BPA-PC shows favorable interactions with other polycarbonates having a range of aliphatic connector groups including those having methyl groups on the phenyl rings." (Kim and Paul, "Effects of Polycarbonate Molecular Structure on the Miscibility with Other Polymers", Macromolecules 1992, 25:3097-3105). A tenth homopolycarbonate which is not miscible with BPA-PC is given in the more recent paper by Haggard and Paul ("Blends of high temperature copolycarbonates with bisphenol-A-polycarbonate and a copolyester", Polymer 2004, 45:2313-2320). In addition to citing the immiscibility of the commercial isophorone-PC with BPA-PC, this paper also cites the facile miscibilities of many of the copolymers composed of the same monomers, in spite of the fact that the homopolymers are NOT miscible. In the same 1992 paper cited above, Kim and Paul conclude that "BPA-PC is miscible with a wide range of other polycarbonates having aliphatic hydrocarbon connector groups in the bisphenol. Incorporation of aromatic or strong polar connector groups seems to cause immiscibility with BPA-PC."

Thus, miscibility of aromatic, especially high aspect ratio polycarbonates as in the present invention contradict previous findings in the literature in terms of what is known about miscibility. The present invention provides syntheses of numerous co- and homopolycarbonates containing high-aspect ratio bisphenolic monomers. Polycarbonate-containing aromatic monomers, such as bis[4-(4'-hydroxyphenyl)phenyl]propane ("TABPA"), or 2-(4-hydroxyphenyl)-2-[4-(4'-hydroxyphenyl)phenyl]propane ("TriBPA"), may be blended with miscibility with a variety of aromatic polycarbonate homopolymers and copolymers.

SUMMARY OF THE INVENTION

The present invention relates to a composition of a miscible polycarbonate blend which comprises two or more aromatic polycarbonates, of which at least one polycarbonate contains one or more bisphenol monomeric units which have aspect ratios larger than that of bisphenol A. The blendable polycarbonates have the structure of Formula I:

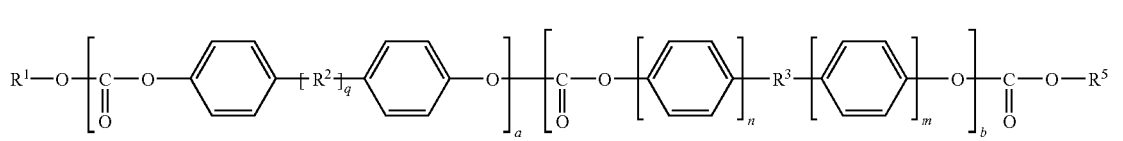

wherein a and b are integers each independently from about 0 to about 1,000 and the average molecular weight is no greater than 250,000 Da;

n and m are integers each independently from about 1 to about 3;

q is an integer of 0 or 1 when b is greater than 0 and q is 1 when b is 0;

$R^1$ and $R^5$ are capping groups, which each are independently selected from the group consisting of hydrogen, $C_{1-20}$ alkyl, and $C_{6-20}$ aryl; and $R^2$ and $R^3$ are divalent linkers, each independently selected from the group consisting of $C_{1-20}$ alkylene and $C_{6-20}$ arylene.

In one embodiment of the present invention, the miscible polycarbonate blend comprises two or more homopolycarbonates, each having a structure of the formula I, wherein a or b is 0. Each homopolycarbonate in the polycarbonate blend may have a structure of the formula I, wherein a is 0. Alternatively, each homopolycarbonate may have a structure of the formula I, wherein b is 0. Furthermore, the polycarbonate blend may contain a first homopolycarbonate having a structure of the formula I, wherein a is 0, and a second homopolycarbonate having a structure of the formula I, wherein b is 0.

In one aspect of the embodiment, the miscible homopolycarbonate blend comprises two aromatic homopolycarbonates: a first and second homopolycarbonate. The first homopolycarbonate is BPA-PC whereas the second polycarbonate TriBPA is a homopolycarbonate having a structure of the Formula II:

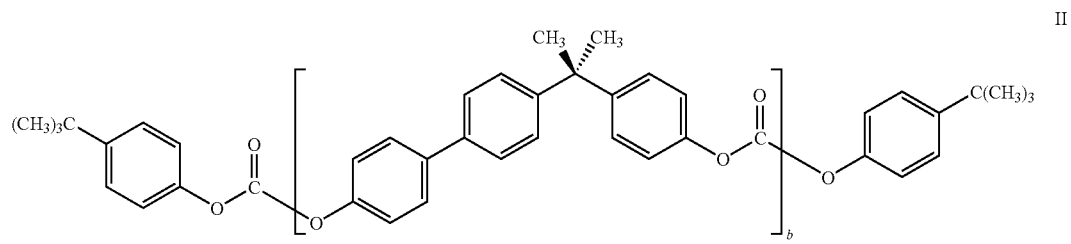

wherein b is an integer of 1 to 750.

In another aspect of the embodiment, the miscible homopolycarbonate blend comprises at least one homopolycarbonate with a high aspect ratio. The homopolycarbonates are each independently selected from the group consisting of BPA-PC, TABPA-PC, and TriBPA.

In yet another embodiment, the miscible polycarbonate blend comprises one or more homopolycarbonates, and one or more copolycarbonates. As described hereinabove, each homopolycarbonate has a structure of the formula I, wherein a or b is 0, and each copolycarbonate has a structure of the formula I, wherein both a and b are greater than 0.

In one aspect of the embodiment, the miscible polycarbonate blend comprises one aromatic homopolycarbonate of BPA-PC or TriBPA and one aromatic copolycarbonate, a copolymer of bisphenol-A and TAPBA, having a structure of the Formula III

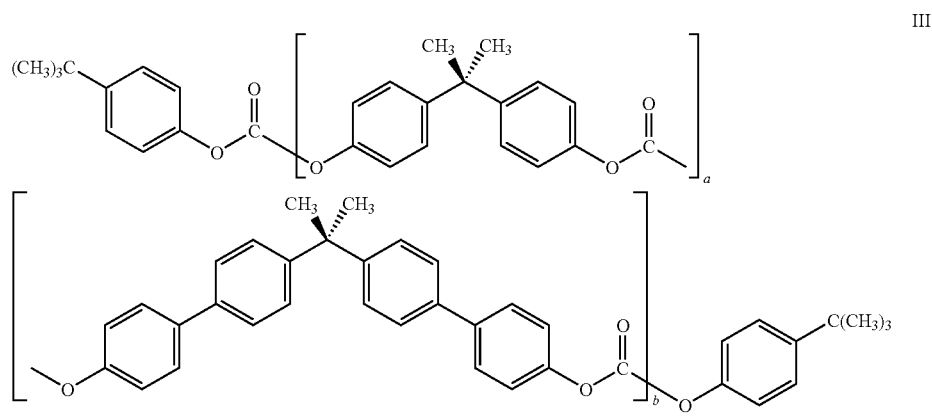

wherein a and b each are integers each independently from 1 to 1,000 and the average molecular weight is no greater than 250,000 Da.

In another aspect of the embodiment, the miscible polycarbonate blend comprises one aromatic homopolycarbonate of BPA-PC or TriBPA and one aromatic copolycarbonate, a copolymer of bisphenol-A and TriBPA, having a structure of the Formula IV

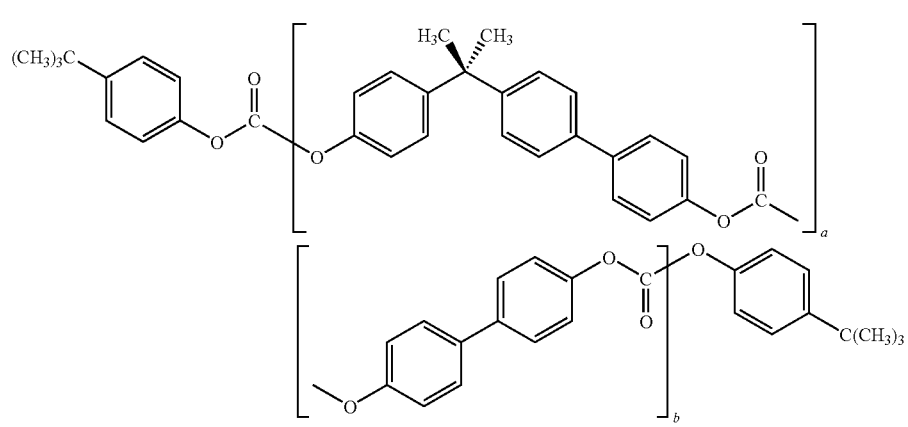

where a and b each are integers each independently from 1 to 1,000 and the average molecular weight is no greater than 250,000 Da.

In still another aspect of the embodiment, the miscible polycarbonate blend comprises one or more homopolycarbonates and one or more copolycarbonates with at least one having a high aspect ratio. The homopolycarbonates are each independently selected from the group consisting of BPA-PC, TABPA-PC, and TriBPA. The copolycarbonates are each independently selected from the group consisting of TABPA-PC, TriBPA-PC, TABPA/BPA-PC, TABPA/DOD-PC, TriBPA/BPA-PC, and TriBPA/DOD-PC.

In an alternative embodiment, the miscible polycarbonate blend comprises two or more copolycarbonates, each having a structure of the formula I, wherein both a and b are greater than 0. In particular, at least one of the copolycarbonates has a high aspect ratio. The copolycarbonates may each independently be selected from the group consisting of TABPA-PC, TriBPA-PC, TABPA/BPA-PC, TABPA/DOD-PC, TriBPA/BPA-PC, and TriBPA/DOD-PC.

The present invention further relates to methods for making these polycarbonate blends. In one embodiment, the polycarbonate blend is prepared using a solution blending method, which includes the steps of dissolving the polycarbonates in a suitable solvent, casting the solution into a thin film, and drying the thin film to produce a homogeneous polycarbonate blend. In another embodiment, the polycarbonate blend is prepared using a melt blending method, which includes the steps of drying the polycarbonate polymers under vacuum and feeding to an extruder for blending.

The polycarbonate blend of the present invention is a miscible polymer blend, which is transparent and has a single glass transition temperature. The polycarbonate blend prepared by either solution or melt blending method exhibits one-phase behavior in thermal testing with a single glass transition value which is different from these of individual polymers. Furthermore, optical transparency of the polycarbonate blend provides an additional evidence of complete miscibility of these individual polymers.

BRIEF DESCRIPTION OF THE DRAWINGS

FIG. 1 shows the correlation of the mole fractions of TABPA/BPA-PC in the binary BPA-PC and TABPA/BPA-PC blends versus their glass transition temperatures.

FIG. 2 shows the correlation of the mole fractions of TABPA/BPA-PC in the binary BPA-PC and TABPA/BPA-PC blends versus their glass transition temperatures.

FIG. 3 shows the correlation of the mole fractions of TriBPA/DOC-PC in the binary BPA-PC and TriBPA/DOC-PC (75:25) polycarbonate blends versus their glass transition temperatures.

DETAILED DESCRIPTION OF THE INVENTION

Figure 4:
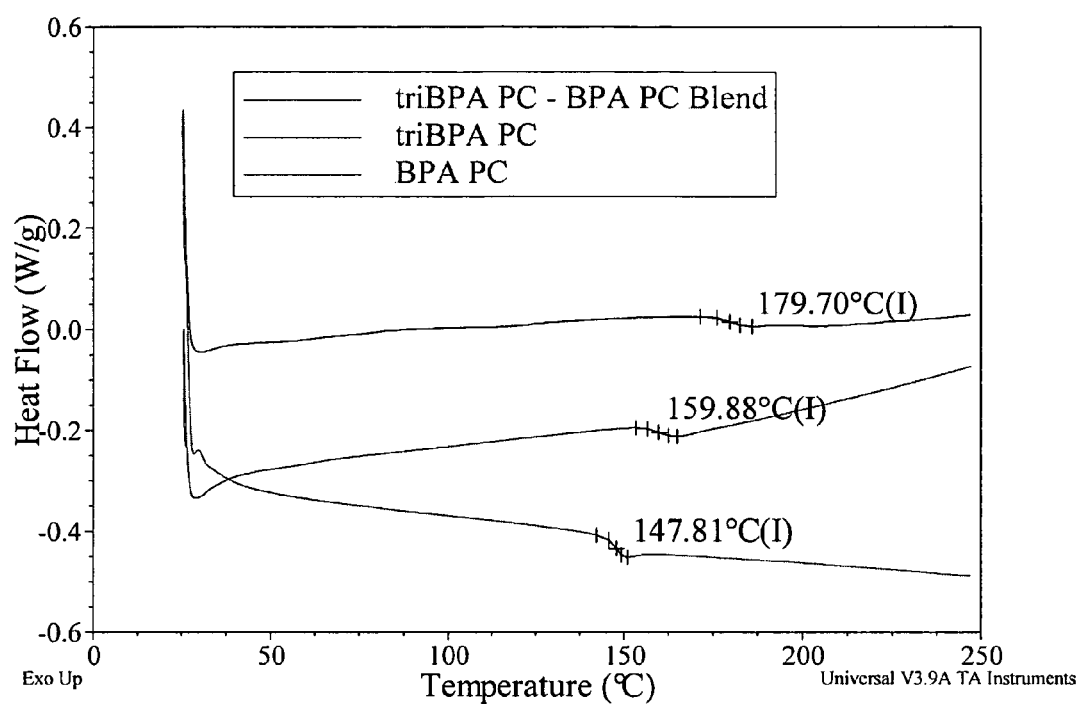
FIG. 4 shows DSC for individual polymers in the blend in comparison with that of a binary polymer blend of BPA-PC and TriBPA-PC.

The present invention relates to a polycarbonate blend composition which comprises two or more polycarbonate polymers. In particular, the polycarbonate blend contains at least one polycarbonate polymer with a high aspect ratio. The polycarbonate blends of the present invention are miscible and transparent. The present invention also relates to methods for making these polycarbonate blends. The polycarbonate blend may be prepared using a solution blending method, which includes the steps of dissolving the polycarbonates in a suitable solvent, casting the solution into a thin film, and drying the thin film to produce a homogeneous polycarbonate blend. The polycarbonate blend may also be prepared using a melt blending method, which includes the steps of drying the polycarbonate polymers under vacuum and feeding to an extruder for blending.

As used in this disclosure, the singular forms "a", "an", and "the" may refer to plural articles unless specifically stated otherwise. Unless defined otherwise, all technical and scientific terms used herein generally have the same meaning as commonly understood by one of ordinary skill in the art to which this invention belongs. Generally, the nomenclature used herein and the laboratory procedures in analytical chemistry, organic chemistry, material sciences, and polymer chemistry described herein are those well known and commonly employed in the arts.

To facilitate understanding of the invention set forth in the disclosure that follows, a number of abbreviations and terms are defined below.

Abbreviations
  BPA—bisphenol A
  DOD—4,4'-dihydroxybiphenyl
  DSC—Differential scanning calorimetry
  PC—polycarbonate R—a general abbreviation for a substituent group selected from alkyl, heteroalkyl, aryl, and heterocycles TABPA—bis[4-(4'-hydroxyphenyl)phenyl]propane TriBPA—2-(4-hydroxyphenyl)-2-[4-(4'-hydroxyphenyl)phenyl]propane Definition The term "aspect ratio" refers to a ratio of the length of the monomeric unit of a polycarbonate over its width. In particular, the term "a high aspect ratio" refers to a polycarbonate which contains at least one bisphenol monomeric unit having an aspect ratio higher than that of bisphenol A. Since the monomeric units, TriBPA and TABPA, all have higher aspect ratios than bisphenol A, polycarbonates containing TriBPA or TABPA are considered as high aspect ratio polycarbonates in the context of the present invention.

The term "alkyl" refers to a saturated aliphatic hydrocarbon having a specified number of carbon atoms, which may be linear or branched. For example, "$C_{1-6}$ alkyl" and "$C_{1-10}$ alkyl" denote alkyl having 1 to 6 or 1 to 10 carbon atoms, respectively. Examples of alkyl include, but are not limited to, methyl, ethyl, n-propyl, i-propyl, n-butyl, i-butyl, sec-butyl, t-butyl, n-pentyl, n-hexyl, n-octyl, n-nonyl, n-decyl and the like. Additionally, unless otherwise specified, "propyl" denotes n-propyl or i-propyl; "butyl" denotes n-butyl, i-butyl, sec-butyl, or t-butyl. As used herein, the term "alkyl" also includes, unless otherwise specified, those groups described below as "alkenyl," "alkynyl," "cycloalkyl," and "cycloalky(alkyl)."

The term "alkylene" refers to a divalent radical derived from an alkane, as exemplified, but not limited, by —CH$_2$—CH$_2$—CH$_2$—CH$_2$—, and further includes alkenylene (a divalent radical derived from an alkenyl), alkynylene (a divalent radical derived from an alkynyl), cycoalkylene (a divalent radical derived from a cycoalkyl, and cycloalky(alkylene) (a divalent radical derived from cycloalky(alkyl)). Typically, an alkylene group has 1 to 25, 1 to 20, 1 to 15, 1 to 10, or 1 to 6 carbon atoms. When an alkylene group serves as a bridging group, no orientation of the bridging group is implied by the direction in which the formula of the bridging group is written.

The term "alkenyl" refers to a hydrocarbon chain of either a linear or branched configuration with one or more unsaturated carbon-carbon bonds which may occur in any stable carbon atom along the chain without violating carbon valency. For example, "$C_{2-6}$ alkenyl" includes, but is not limited to ethenyl, 1-propenyl, 2-propenyl, 1-butenyl, 2-butenyl, 3-butenyl, 3-methyl-2-butenyl, 2-pentenyl, 3-pentenyl, hexenyl, and the like.

The term "alkynyl" refers to a hydrocarbon chain of either a straight or branched configuration with one or more carbon-carbon triple bonds which may occur in any stable carbon atom along the chain without violating carbon valency. For example, "$C_{2-6}$ alkynyl" includes, but is not limited to, ethynyl, 1-propynyl, 2-propynyl, 1-butynyl, 2-butynyl, 3-butynyl, and the like.

The term "cycloalkyl" refers to a saturated and non-aromatic unsaturated ring group having the specified number of carbon atoms. For example, "$C_{3-6}$ cycloalkyl" denotes such as cyclopropyl, cyclobutyl, cyclopentyl, cyclohexyl, 3-cyclohexenyl, and cycloheptyl.

The term "cycloalky(alkyl)" refers to an alkyl group with a cycloalky attached to one of the carbons of the alkyl group. For example, "$C_{3-6}$ cycloalkyl($C_{1-4}$ alkyl)" denotes such as cyclopropylmethyl, 1-cyclopropylethyl, 2-cyclopropylethyl, cylcobutylmethyl, 2-cyclobutylethyl, cyclobutylethyl, 2-cyclopentylethyl, cyclohexylmethyl, and 2-cyclohexylethyl.

The term "aryl" refers to a substituted or unsubstituted polyunsaturated, aromatic hydrocarbon which can be a single ring or multiple rings which are fused together or linked covalently. Non-limiting examples of aryl groups include phenyl, 1-naphthyl, 2-naphthyl, and 4-biphenyl. The aryl group may also be substituted, for example, with one or more common functional groups as described herein, $C_{1-6}$ alkyl; $C_{1-6}$ alkoxy, $C_{3-8}$ cycloalkyl, or heterocycle.

The term "arylene" refers to a divalent radical derived from an aryl group, as exemplified, but not limited to, by -Ph-.

The term "alkoxy" or "alkyloxy" refers to an alkyl group as defined above with the indicated number of carbon atoms attached through an oxygen bridge. Examples of alkoxy include, but are not limited to, methoxy, ethoxy, n-propoxy, i-propoxy, n-butoxy, s-butoxy, t-butoxy, n-pentoxy, and s-pentoxy. Unless otherwise specified, "propoxy" denotes n-propoxy or i-propoxy; "butoxy" denotes n-butoxy, i-butoxy, sec-butoxy, or t-butoxy.

The term "halogen" refers to fluoro, chloro, bromo, and iodo.

The term "substituted" means that any one or more hydrogens on the designated atom, for example, a carbon atom of an alkyl chain, is replaced with a selection from the indicated group, provided that the designated atom's normal valency is not exceeded, and that the substitution results in a stable compound. The substitution group or substituent can be one of a variety of groups selected from, but not limited to: alkyl, heteroalkyl, aryl, heterocycles, or functional groups, including —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"', —NR—C(NR'R")=NR"', —S(O)R', —S(O)$_2$R', —S(O)$_2$NR'R", —NRSO$_2$R', —CN and —NO$_2$.

The term "heteroatom" refers to boron, oxygen, nitrogen, phosphorus, sulfur, and silicon.

The term "homopolycarbonate" refers a polycarbonate polymer formed from one type of monomer.

The term "copolycarbonate" or "heteropolycarbonate" refers to a polycarbonate polymer formed when two or more different types of monomer are linked in the same polymer chain. The assembly of the monomers in the copolymers can be head-to-tail, head-to-head, or tail-to-tail. The copolycarbonate may be a random copolymer, an alternative copolymer, a block copolymer, or a graft copolymer. The structural representations of the copolycarbonates in Formulae I to IV are used herein to illustrate the mole ratios between the monomeric units and do not imply that these copolycarbonates are block copolymers. These copolycarbonates can be random copolymer, alternative copolymer, a block copolymer, or a graft copolymer.

Polycarbonates

The polycarbonate polymer blend of the present invention comprises two or more polycarbonates, each having a structure as represented by Formula I:

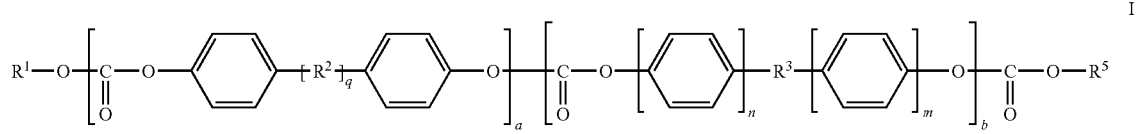

wherein a, b, m, n, q, $R^1$, $R^2$, $R^3$, and $R^5$ are as described above.

The capping groups $R^1$ and $R^5$ in each polymer of the polycarbonate polymer blend may be the same or different. Each capping group is independently selected from a group consisting of hydrogen, $C_{1-20}$ alkyl, $C_{1-20}$ heteroalkyl, $C_{6-20}$ aryl, and $C_{1-10}$ heterocycles. Suitable $C_{1-20}$ alkyl groups include, but are not limited to, methyl, ethyl, n-propyl, iso-propyl, n-butyl, isobutyl, and t-butyl. The $C_{6-20}$ aryl group may have one or more substituents on the aromatic ring structure. Suitable substitution groups include, but are not limited to, alkyl, heteroalkyl, aryl, heterocycles, or functional groups, such as —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"', —NR—C(NR'R")=NR"', —S(O)R', —S(O)$_2$R', —S(O)$_2$NR'R", —NRSO$_2$R', —CN and —NO$_2$. Suitable $C_{6-20}$ aryl groups include, but are not limited to, phenyl, mono- or poly-substituted phenyls, such as p-alkylphenyl, o-alkylphenyl, and m-alkylphenyl, in which the alkyl may be methyl, ethyl, n-propyl, isopropyl, n-butyl, isobutyl, t-butyl, and trifluoromethyl; p-alkoxylphenyl, o-alkoxylphenyl, and m-alkoxylphenyl, in which the alkoxyl may be methoxyl, ethoxyyl, n-propoxyl, isopropoxyl, n-butoxyl, isobutoxyl, and t-butoxyl; and halogenated phenyls such as p-halophenyl. Suitable $C_{1-20}$ heteroalkyl groups include, but are not limited to, trifluoromethyl or pentafluoroethyl.

The two divalent linkers $R^2$ and $R^3$ may be the same or different. Each is independently selected from the group consisting of hydrogen, $C_{1-20}$ alkylene and $C_{6-20}$ arylene. Suitable alkylene groups include, but are not limited to, methylene, ethylenes (e.g., 1,1-ehtylene and 1,2-ethylene), propylenes (e.g., 1,1-propylene, 1,2-propylene, 1,3-propylene, and 2,2-propylene).

Each of the aryl groups that form the polymeric backbone of the polycarbonate contains two backbone substitutions, through which the backbone of the polymer is connected. The two backbone substitutions in each aryl group may independently be ortho, meta, or para. In addition to the two backbone substitutions, each aryl group may also independently have one or more additional substitutions. Suitable substitution groups include, but are not limited to, alkyl, heteroalkyl, aryl, heterocycles, or functional groups, such as —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"', —NR—C(NR'R")=NR"', —S(O)R', —S(O)$_2$R', —S(O)$_2$NR'R", —NRSO$_2$R', —CN and —NO$_2$. In other words, each backbone aryl may be di-, tri-, tetra-, penta-, and hexa-substituted. Furthermore, each aryl group may be symmetric, such as having C2 symmetry or mirror symmetry. Each aryl group may also be unsymmetrical. Each polymer in the polycarbonate polymer blend may be symmetric (such as having C2 symmetry, C3 symmetry, or mirror symmetry) or unsymmetrical.

Each polycarbonate in the polycarbonate polymer blend of the present invention may independently be a homopolycarbonate with a structure of the Formula I, wherein a or b is 0, or a copolycarbonate with a structure of the Formula I, wherein both a and b is greater than 0. Suitable homopolycarbonates include, but are not limited to, BPA-PC, TABPA-PC, and TriBPA-PC.

Suitable copolycarbonate polymers for the present invention may contain two or more monomeric units. Suitable dipolycarbonates include, but are not limited to, TABPA/BPA-PC, TABPA/DOD-PC, TriBPA/BPA-PC, TriBPA/DOD-PC, and DOD/BPA-PC. For a polycarbonate with two monomeric units, the mole fraction of each monomeric unit may vary from about 0.001 to about 0.999, from about 0.01 to about 0.99, from about 0.05 to about 0.95, from about 0.10 to about 0.90, from about 0.20 to about 0.80, from about 0.3 to about 0.7, or from about 0.4 to about 0.6. For a terpolycarbonate, a copolycarbonate with three monomeric units, each monomeric unit may have a mole fraction of from about 0.001 to about 0.999, from about 0.01 to about 0.99, from about 0.05 to about 0.95, from about 0.10 to about 0.90, from about 0.20 to about 0.80, from about 0.3 to about 0.7, or from about 0.4 to about 0.6. The total of the all mole fractions of all monomeric units in a copolycarbonate equals 1.

The molecular weight of the polycarbonate, either a homopolymer or copolymer, may vary from about 1,000 to about 250,000 Da, to about 200,000 Da, or to about 150,000 Da; from about 2,000 to about 250,000 Da, to about 200,000 Da, or to about 150,000 Da; from about 5,000 to about 250,000 Da, to about 200,000 Da, or to about 150,000 Da; from about 10,000 to about 250,000 Da, to about 200,000 Da, or to about 150,000 Da; from about 25,000 to about 250,000 Da, to about 200,000 Da, or to about 150,000 Da; or from about 50,000 to about 250,000 Da, to about 200,000 Da, or to about 150,000 Da.

The polycarbonate may have a molecular weight distribution of no greater than about 5, no greater than about 4, no greater than about 3, or no greater than about 2.

The polycarbonate polymers used in the present invention are not limited by commercial sources or methods of preparation. These polycarbonate polymers may readily be prepared according to known procedures by reacting a dihydroxyaromatic compound with a carbonate precursor such as phosgene, a haloformate or a carbonate ester, a molecular weight regulator, an acid acceptor and a catalyst. Methods for preparing polycarbonates are known in the art, including interfacial polymerization and melt polymerization.

Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, and the like) or a glycol (e.g., the bishaloformate of ethylene glycol, neopentyl glycol, polyethylene glycol, and the like). Combinations comprising at least one of the foregoing types of carbonate precursors may also be used.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

Polycarbonate Polymer Blends

The polycarbonate blend of the present invention comprises two or more polycarbonate polymers as represented by Formula I. In one embodiment, the miscible polycarbonate blend comprises two or more aromatic homopolycarbonates.

In a specific embodiment, the miscible polycarbonate blend comprises two aromatic homopolycarbonates: a first and second homopolycarbonate. The two homopolycarbonates are independently selected from the group consisting of BPA-PC, TABPA-PC and TriBPA-PC.

In another embodiment, the miscible polycarbonate blend comprises one or more homopolycarbonates, and one or more copolycarbonates. The homopolycarbonate may be selected from the group consisting of BPA-PC, TABPA-PC and TriBPA-PC. The copolycarbonate may independently be selected from the group consisting of TABPA/BPA-PC, TABPA/DOD-PC, TriBPA/BPA-PC, TriBPA/DOD-PC, and DOD/BPA-PC.

In another embodiment, the miscible polycarbonate blend comprises two copolycarbonates, wherein both a and b are greater than 0 in each polymer. The copolycarbonate may independently be selected from the group consisting of TABPA/BPA-PC, TABPA/DOD-PC, TriBPA/BPA-PC, TriBPA/DOD-PC, and DOD/BPA-PC.

In certain embodiments, each polycarbonate polymer in the miscible polycarbonate blend may varies from about 0.001 to about 0.999, from about 0.01 to about 0.99, from about 0.05 to about 0.95, from about 0.10 to about 0.90, or from about 0.2 to about 0.8 in mole fraction. The mole fractions of all the polycarbonate polymers in the blend together are no greater than 1.

In certain embodiments, it may be advantageous to have at least one polycarbonate polymer with a high aspect ratio. Suitable polycarbonates with a high aspect ratio are those polymers that contain a monomeric unit having a high aspect ratio (such as TABPA and TriBPA), including, but not limited to, TABPA-PC, TriBPA-PC, TABPA/BPA-PC, TABPA/DOD-PC, TriBPA/BPA-PC, and TriBPA/DOD-PC.

Preparation Methods for Polycarbonate Polymer Blends

The polycarbonate blend of the present invention is prepared using either a solution blending method or a melt blending method. The solution blending method includes the steps of (i) dissolving the polycarbonates in a suitable solvent; (ii) casting the solution into a thin film; and (iii) drying the thin film to produce a homogeneous miscible polycarbonate blend. The melt blending method includes the steps of (i) preparing the polycarbonate polymers by drying under vacuum and (ii) feeding both polycarbonate polymers to an extruder for blending to yield a homogeneous miscible polycarbonate blend.

Both methods produce the polycarbonate polymer blend having the characteristics of a miscible polymer blend. The polycarbonate polymer blend is transparent with a single glass transition temperature, which is also different from the single glass transition temperature of each individual polycarbonate polymer.

EXAMPLES

The following examples serve to provide further appreciation of the invention but are not meant in any way to restrict the effective scope of the invention.

Example I

A Polycarbonate Blend of TABPA/BPA-PC (50:50) and BPA-PC

The polycarbonate polymer blend contains two polycarbonate polymers, a homopolycarbonate, commercially available BPA-PC, and a copolycarbonate, TABPA/BPA-PC. Both solution and melt blending methods produced transparent blended materials at all mole ratio of these two polycarbonate polymers, demonstrating that they are miscible at all concentrations. The effect of molecular weight of the copolycarbonate on the polycarbonate blends was also studied. It was found that the blends prepared from high molecular weight TABPA/BPA-PC behave similarly to the blends prepared from low molecular weight TABPA/BPA-PC with respect to thermal and optical clarity, thus indicating that there are no significant effects on the miscibility of these two polycarbonate polymers.

The homopolycarbonate, BPA-PC, was obtained commercially as BPA-PC pellets with an average molecular weight ($M_w$) 29,810 g/mol. BPA-PC may be from a variety of commercial sources with various grades. It may be used in preparation of polycarbonate blends with or without pre-purification.

The copolycarbonate, TABPA/BPA-PC, with a mole ratio of 50/50, was synthesized using an interfacial process and phosgene gas, and the copolymer was worked up and purified as described (Boyles, et al. "Synthesis of High Aspect Ratio Bisphenols and Polycarbonates Incorporating Bisaryl Units," *Macromolecules*, 2005, 38(9):3622-3629). The structure of the BPA/TABPA-PC polycarbonate is shown in Formula III. By varying polymerization conditions, TABPA/BPA-PC obtained has an average molecular weight ($M_w$) ranging from about 22,030 to about 55,800 Da.

Solution blended compositions were prepared using TABPA/BPA-PC with an $M_w$ of about 55,800 Da. TABPA/BPA-PC of an $M_w$ of about 22,030 Da was used for melt blending.

In the solution blending method, commercial BPA-PC pellets were dissolved in methylene chloride and the resulting viscous solution was precipitated with the addition of methanol. The white pure polymer was filtered and dried at 80° C. under vacuum for 24 h to give purified material. The purified BPA-PC was then blended with TABPA/BPA-PC in various mole ratios, including 1:1, 1:2, 1:3, 1:3.5, 1:4, 1:4.5, and 1:6 of BPA-PC over TAPBA/BPA-PC by first mixing the two polycarbonate polymers in methylene chloride, casting the solution as thin films on glass slides, and then drying the cast blends in vacuo.

BPA-PC and TABPA/BPA-PC blends prepared by the solution method were transparent at all mole fractions tested. DSC results confirm the excellent miscibility in the blends: a single glass transition was observed for all the blends. Furthermore, $T_g$ of the blends was compositionally dependent and increases with the addition of TABPA/BPA-PC in the blends. Equation 1 may be applied as an approximate description of the compositional dependence of polymer blends.

$$\frac{1}{T_g} = \frac{W_1}{T_{g1}} + \frac{W_2}{T_{g2}} \qquad \text{Eq. 1}$$

wherein $W_1$ and $W_2$ are the mole fractions of component 1 (BPA-PC) and 2 (TABPA/BPA-PC) in the blend, and $T_{g1}$, $T_{g2}$ and $T_g$ are the glass transition temperatures of component 1, 2, and the blend, respectively. FIG. 1 and Table I show the calculated $T_g$ of the blends from the Fox equation and the experimental $T_g$ of the blends from DSC data. The experimental data were in good agreement with the values calculated by the Fox equation.

In the melt blending method, the polycarbonate blends were prepared using a HAAKE MiniLab (Thermo Electron Corporation), co-rotating, intermeshing twin screw extruder (diameter=5/14 mm, conical) using a barrel temperature of 260° C., a screw speed of 80 rpm and a cycle time of 5 min. Polycarbonate materials were dried in a vacuum oven at 100° C. for 24 h prior to blending. The polymers were then dry mixed at various blend ratios and fed simultaneously into the extruder. The series of BPA-PC (commercial pellets, unpurified) and TABPA/BPA-PC blends were prepared using a mole ratio of BPA-PC verse TABPA/BPA-PC of 1:0.04, 1:0.08, 1:0.12, and 1:0.16. Each single blend of BPA-PC and TABPA/BPA-PC yields a single $T_g$ as determined from DSC measurements of the transparent blend materials produced. It should be noted that increasing the mol ratio of TABPA/BPA-PC results in an increase in $T_g$ of the blend composition. Melt blended materials exhibited good agreement of experimental and calculated $T_g$s from the Fox equation (FIG. 2 and Table II) as did the solution blended materials.

TABLE I

Glass Transition Temperatures for Compositions of BPA-PC with TABPA/BPA-PC Blends (Solution Cast, Example I)

| X mol fraction of TABPA/BPA-PC | Exp. $T_g$ (° C.) | Calcd $T_g$ (° C.) |
| --- | --- | --- |
| 0.00 | 148.05 | 148.05 |
| 0.50 | 166.90 | 169.97 |
| 0.67 | 175.32 | 177.83 |
| 0.75 | 176.73 | 181.68 |
| 0.78 | 179.49 | 183.11 |
| 0.8 | 172.21 | 184.11 |
| 0.82 | 182.00 | 184.51 |
| 0.86 | 185.50 | 186.64 |
| 1.00 | 194.29 | 194.29 |

TABLE II

Glass Transition Temperatures for Compositions of BPA-PC with TABPA/BPA-PC Blends (Melt Blending, Example I)

| X mol fraction of TABPA/BPA-PC | Exp. $T_g$ (° C.) | Calcd $T_g$ (° C.) |
| --- | --- | --- |
| 0.00 | 150.36 | |
| 0.04 | 148.90 | 151.25 |
| 0.08 | 150.45 | 150.93 |
| 0.12 | 150.91 | 151.22 |
| 0.16 | 151.49 | 151.50 |
| 1.00 | 157.62 | |

In summary, the miscible blends of bisphenol A polycarbonate (BPA-PC) with tetraarylbisphenol A-bisphenol A polycarbonate copolymer (TABPA/BPA-PC) are formed by either solution or melt blending. The blends are miscible at all concentrations tested. The $T_g$ values of the blends correlate linearly with the mole fraction of TABPA/BPA-PC, demonstrating that the two polycarbonates are miscible at all concentrations.

Example II

A Polycarbonate Blends of TriBPA/DOD-PC (75:25) with BPA-PC

The polycarbonate polymer blend comprises two polycarbonates, a homopolycarbonate, BPA-PC, and a copolycarbonate, TriBPA/DOD-PC. BPA-PC was purified as in Example 1 prior to blending. TriBPA/DOD-PC (75:25) with a structure as shown in Formula IV was synthesized as described (Boyles, et al. "Synthesis of High Aspect Ratio Bisphenols and Polycarbonates Incorporating Bisaryl Units," *Macromolecules*, 2005, 38(9):3622-3629).

The polycarbonate blends were prepared using the solution blending method. These polycarbonate blends are transparent at all concentrations tested as shown in FIG. 3 and Table III, demonstrating miscibility at all concentrations.

TABLE III

Glass Transition Temperatures for Compositions of BPA-PC with TriBPA/DOD-PC (75:25) Blends (Solution Cast, Example II)

| X mol fraction of TriBPA/DOD-PC | Exp. $T_g$ (° C.) | Calcd $T_g$ (° C.) |
| --- | --- | --- |
| 0.00 | 147.81 | 147.81 |
| 0.20 | 151.37 | 157.42 |
| 0.30 | 152.46 | 162.23 |
| 0.35 | 155.63 | 164.69 |
| 0.40 | 158.66 | 167.18 |
| 0.45 | 166.25 | 169.69 |
| 0.50 | 169.11 | 172.23 |
| 0.60 | 173.22 | 177.42 |
| 0.80 | 189.45 | 188.13 |
| 1.00 | 199.35 | 199.35 |

Example III

A Polycarbonate Blends of TriBPA-PC with TABPA/BPA-PC (50:50)

The polycarbonate polymer blend comprises two polycarbonate polymers, a homopolycarbonate, TriBPA-PC, and a copolycarbonate, TABPA/BPA-PC (50:50). The structures of TriBPA-PC and TABPA/BPA-PC (50:50) are shown in Formulae II and III, respectively.

TABPA/BPA-PC (50:50) was synthesized using an interfacial process and phosgene gas (Boyles, et al. "Synthesis of High Aspect Ratio Bisphenols and Polycarbonates Incorporating Bisaryl Units," *Macromolecules*, 2005, 38(9):3622-3629). The TriBPA monomer and polymer were synthesized as described previously (Filipova, et al. "Polycarbonate of a bisphenol A analogue having three aryl rings", 230th ACS National Meeting, Washington, D.C., August 2005; Boyles and Bendler, U.S. Provisional Patent Application No. 60/421,299, filed on Oct. 24, 2002; Boyles and Bendler, U.S. Provisional Patent Application No. 60/456,615 filed on Mar. 21, 2003. TABPA/BPA-PC obtained has an average molecular weight of about 55,800 Da. Solution blended composites were prepared using TABPA/BPA-PC of an $M_w$ of about 55,800 Da and TriBPA-PC with an $M_w$ of about 69,560 Da.

Solution blending of a 1:1 mol mixture of the two polymers shown in FIG. 3 gave a transparent film. A single $T_g$ that is between the $T_g$s of the pure polymers was detected. The experimental/calculated $T_g$s for TriBPA-PC with TABPA/BPA-PC blend were 172.81° C. and 172.03° C., respectively.

Example IV

A Polycarbonate Blend of TriBPA-PC with BPA-PC

The polycarbonate polymer blend comprises two polycarbonate polymers, a first homopolycarbonate, BPA-PC, and a second homopolycarbonate, TriBPA-PC. Solution blending of a 1:1 mol mixture gave a transparent film. DSC traces for the TriBPA-PC-based blend are shown in FIG. 4. A single $T_g$ that is between the $T_g$s of the pure polymers was detected. The experimental/calculated $T_g$s for TriBPA-PC with BPA-PC blend were 159.88° C. and 163.17° C., respectively.

Example V

A Polycarbonate Blend of TriBPA-PC with a High MW BPA-PC

The polycarbonate polymer blend comprises two polycarbonate polymers, a first homopolycarbonate, a high molecular weight BPA-PC, and a second homopolycarbonate, TriBPA-PC. The high molecular weight BPA-PC has an $M_w$ of about 156,600 Da. Solution blending of a 1:1 mol mixture gave a transparent film. The glass transition temperature was 172.10° C.

Example VI

A Polycarbonate Blend of TABPA/BPA-PC (50:50) with a High MW BPA-PC

The polycarbonate polymer blend comprises two polycarbonate polymers, a homopolycarbonate, a high molecular weight BPA-PC without purification, and a copolycarbonate, TABPA/BPA-PC (50:50). The high molecular weight BPA-PC has the specifications as in Example 5. Solution blending of a 1:1 mol mixture gave a transparent film. The glass transition temperature was 166.30° C.

Example VII

A Polycarbonate Blend of TriBPA-PC with DOD/BPA-PC (25:75)

The polycarbonate polymer blend contains two polycarbonate polymers, a homopolycarbonate, TriBPA-PC, and a copolycarbonate, DOD/BPA-PC (25:75). Solution blending was carried out at mol mixture ratios of 1:1, 1:4, and 4:1.

Solution blended polymer compositions were prepared using TriBPA-PC with an $M_w$ of about 44,420 Da, and DOD/BPA-PC copolymer with an $M_w$ of about 32,210 Da. The $T_g$ values of the blends from DSC are summarized in Table IV.

TABLE IV

Glass Transition Temperatures for Compositions of TriBPA-PC with DOD/BPA-PC (25:75) Blends (Solution Cast, Example VII)

| X mol fraction of TriBPA-PC | Exp. $T_g$ (° C.) | Calcd $T_g$ (° C.) |
|---|---|---|
| 0.00 | 143.06 | 143.06 |
| 0.20 | 159.30 | 152.90 |
| 0.50 | 173.90 | 168.61 |
| 0.80 | 184.70 | 185.35 |
| 1.00 | 197.30 | 197.30 |

The examples set forth above are provided to give those of ordinary skill in the art with a complete disclosure and description of how to make and use the preferred embodiments of the compositions, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A miscible polycarbonate blend comprising two or more aromatic polycarbonates, each independently having a structure of:

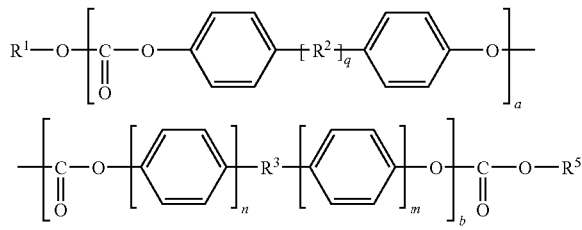

wherein
   a and b are integers each independently from 0 to about 1,000;
      where a or b can be 0; or a and b are greater than 0;
   n and m are integers each independently from about 1 to about 3;
   q is 0 or 1 when b is greater than 0 and q is 1 when b is 0;
   $R^1$ and $R^5$ are capping groups; and
   $R^2$ and $R^3$ are divalent linkers; and
wherein the aromatic polycarbonates are selected from one or more homopolycarbonates and one or more copolycarbonates or a combination thereof;
   where the homopolycarbonates are each independently selected from BPA-PC, TABPA-PC, and TriBPA; and
   where the copolycarbonates are each independently selected from TABPA/BPA-PC, TABPA/DOD-PC, TriBPA/BPA-PC, and TriBPA/DOD-PC;
wherein at least one polycarbonate is a high aspect ratio polycarbonate.

2. The miscible polycarbonate blend of claim 1 comprising a homopolycarbonate and a copolycarbonate, wherein the homopolycarbonate is bisphenol-A polycarbonate, or TriBPA polycarbonate having a structure of

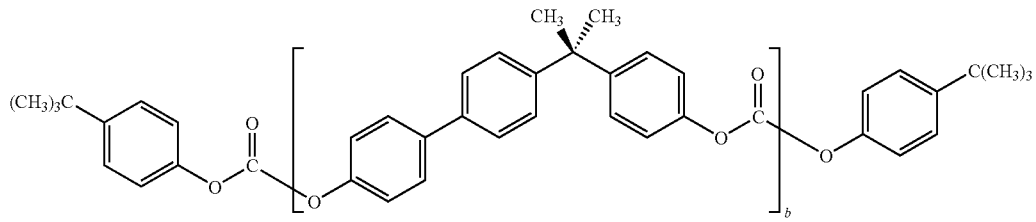

where b is an integer of 1 to 750; and
wherein the copolycarbonate is a copolymer of bisphenol-A and TAPBA, having a structure of

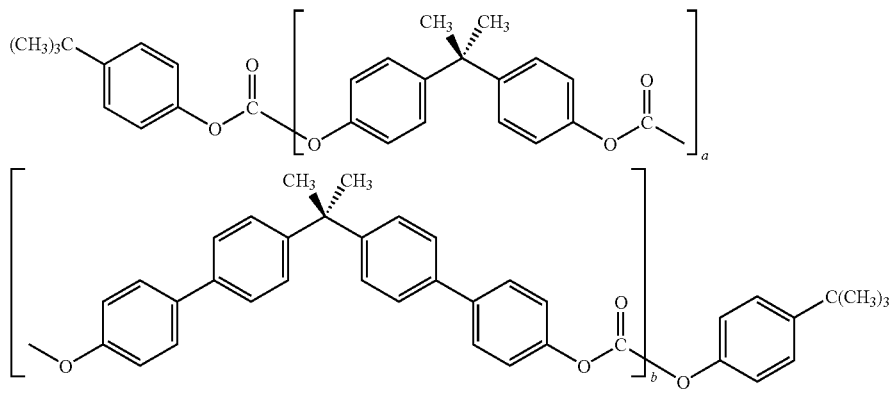

where a and b are integers independently from 1 to 1,000.

3. The miscible polycarbonate blend of claim 2, wherein the homopolycarbonate has an average molecular weight of about 5,000 to about 250,000.

4. The miscible polycarbonate blend of claim 2, wherein the homopolycarbonate has a molecular weight distribution of no greater than about 5.

5. The miscible polycarbonate blend of claim 2, wherein the mole fraction of TAPBA in the copolycarbonate is about 0.05 to about 0.95.

6. The miscible polycarbonate blend of claim 2, wherein the mole fraction of TAPBA in the copolycarbonate is about 0.5.

7. The miscible polycarbonate blend of claim 2, wherein the copolycarbonate has an average molecular weight of about 5,000 to 250,000.

8. The miscible polycarbonate blend of claim 2, wherein the copolycarbonate has a molecular weight distribution of no greater than about 5.

9. The miscible polycarbonate blend of claim 2 comprising about 0.5% to about 99.5% by mole of the homopolycarbonate and about 0.5% to about 99.5% by mole of the copolycarbonate.

10. The miscible polycarbonate blend of claim 1 comprising a homopolycarbonate and a copolycarbonate, wherein the homopolycarbonate is bisphenol-A polycarbonate or TriBPA polycarbonate having a structure of

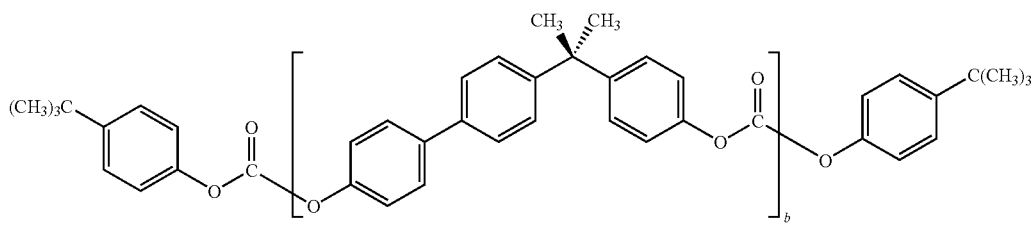

where b is an integer of 1 to 750;
wherein the copolycarbonate is a copolymer of TriBPA and 4,4'-dihydroxybiphenol, having a structure of

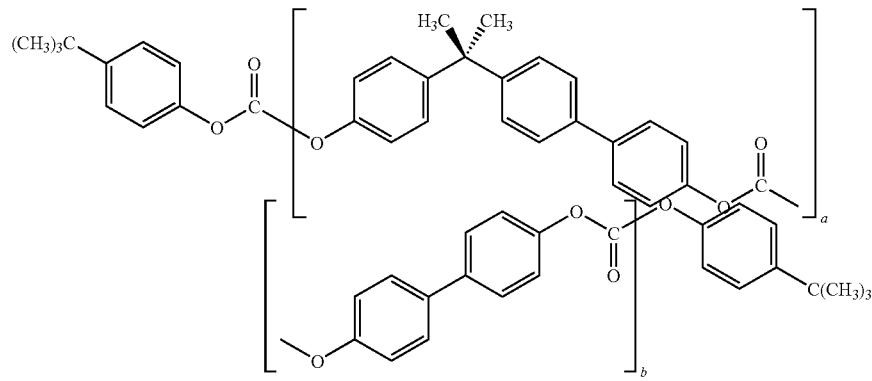

where a and b each are integers each independently from 1 to 1,000.

11. The miscible polycarbonate blend of claim 10, wherein the homopolycarbonate has an average molecular weight of about 5,000 to about 250,000.

12. The miscible polycarbonate blend of claim 10, wherein the homopolycarbonate has a molecular weight distribution of no greater than about 5.

13. The miscible polycarbonate blend of claim 10, wherein the mole fraction of TriBPA in the copolycarbonate is about 0.05 to about 0.95.

14. The miscible polycarbonate blend of claim 10, wherein the mole fraction of TriBPA in the copolycarbonate is about 0.75.

15. The miscible polycarbonate blend of claim 10, wherein the copolycarbonate has an average molecular weight of about 5,000 to 500,000.

16. The miscible polycarbonate blend of claim 10, wherein the copolycarbonate has a molecular weight distribution of no greater than about 5.

17. The miscible polycarbonate blend of claim 10 comprising about 0.5% to about 99.5% by mole of the homopolycarbonate and about 05% to about 99.5% by mole of the copolycarbonate.

18. The miscible polycarbonate blend of claim 1 comprising a first and second homopolycarbonate, wherein the first homopolycarbonate is BPA-PC, and the second polycarbonate is a homopolycarbonate having a structure of 20. The miscible polycarbonate blend of claim 18 comprising about 0.1% to about 99.9% by mole of the first homopolycarbonate and about 0.1% to about 99.9% by mole of the second homopolycarbonate.

21. The miscible polycarbonate blend of claim 1 comprising one or more homopolycarbonates and one or more copolycarbonates with at least one having a high aspect ratio, wherein the homopolycarbonates are each independently selected from the group consisting of BPA-PC, TABPA-PC, and TriBPA; wherein the copolycarbonates are each independently selected from the group consisting of TABPA/BPA-PC, TABPA/DOD-PC, TriBPA/BPA-PC, and TriBPA/DOD-PC.

22. The miscible polycarbonate blend of claim 1 comprising two or more homopolycarbonates with at least one having a high aspect ratio, wherein the homopolycarbonates are each independently selected from the group consisting of BPA-PC, TABPA-PC, and TriBPA.

23. The miscible polycarbonate blend of claim 1 comprising one or more copolycarbonates with at least one having a high aspect ratio, wherein the copolycarbonates are each independently selected from the group consisting of TABPA/BPA-PC, TABPA/DOD-PC, TriBPA/BPA-PC, and TriBPA/DOD-PC.

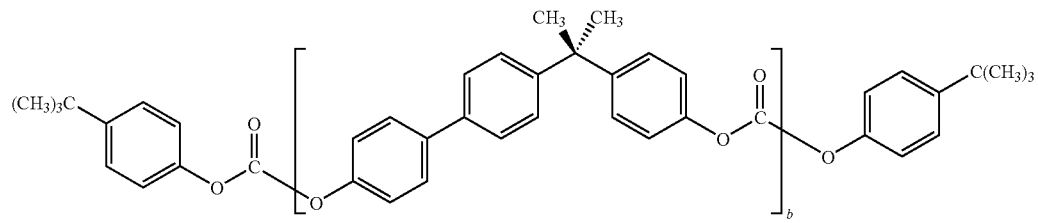

wherein b is an integer of 1 to 750.

19. The miscible polycarbonate blend of claim 18, wherein the homopolycarbonates each have a molecular weight distribution of no greater than about 5.

24. The miscible polycarbonate blend of claim 18, wherein the homopolycarbonates each have an average molecular weight of about 5,000 to about 250,000.

* * * * *